United States Patent
Otsubo et al.

(10) Patent No.: US 9,797,256 B2
(45) Date of Patent: Oct. 24, 2017

(54) TURBINE ROTOR

(71) Applicant: MITSUBISHI HEAVY INDUSTRIES, LTD., Tokyo (JP)

(72) Inventors: Hitomi Otsubo, Tokyo (JP); Takashi Arai, Tokyo (JP); Motoki Ebisu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 381 days.

(21) Appl. No.: 14/380,603

(22) PCT Filed: Feb. 26, 2013

(86) PCT No.: PCT/JP2013/054987
§ 371 (c)(1),
(2) Date: Aug. 22, 2014

(87) PCT Pub. No.: WO2013/129408
PCT Pub. Date: Sep. 6, 2013

(65) Prior Publication Data
US 2015/0037160 A1    Feb. 5, 2015

(30) Foreign Application Priority Data

Feb. 28, 2012   (JP) .................... 2012-041957

(51) Int. Cl.
*F01D 5/02* (2006.01)
*B23K 15/00* (2006.01)
(Continued)

(52) U.S. Cl.
CPC .......... *F01D 5/025* (2013.01); *B23K 15/0006* (2013.01); *B23K 15/0026* (2013.01);
(Continued)

(58) Field of Classification Search
CPC .......... B23K 2201/001; B23K 15/0053; F01D 5/025; F05D 2240/60; F05D 2230/234
See application file for complete search history.

(56) References Cited

U.S. PATENT DOCUMENTS 3,421,201 A * 1/1969 Oberle .................. B22D 19/00
228/113
4,566,810 A * 1/1986 Yoshioka .................. F16C 3/02
384/276

(Continued)

FOREIGN PATENT DOCUMENTS

CN    101844271 A    9/2010
JP    4-167995 A    6/1992
(Continued)

OTHER PUBLICATIONS

Chinese Office Action dated Dec. 28, 2015, issued in the corresponding Chinese Applicatino No. 201380011085.7 with an English Translation.

(Continued)

*Primary Examiner* — Atif Chaudry
(74) *Attorney, Agent, or Firm* — Birch, Stewart, Kolasch & Birch, LLP

(57) ABSTRACT

To provide a turbine rotor which enables mass production with a low-cost apparatus and which capable of suppressing leaning of the rotor shaft after welding to improve the yield, while a turbine blade rotor 12 and the rotor shaft 14 are fit to each other with concave and convex portions 12*a* and 14*a* and are permitted to be rotated, laser beam L from a laser beam generating device 30 is applied to a joint face 16 along the circumferential direction to weld the welding portion. Then, laser beam L is polarized to temper a region X on the rotor shaft side containing the welding portion with laser beam L. In contrast to residual stress $R_1$ having a local angular distribution generated during the welding, residual (Continued)

stress $R_2$ is permitted to be generated over the entire circumference by tempering. Leaning of the rotor shaft 14 after cooling is thereby be suppressed.

3 Claims, 4 Drawing Sheets

(51) Int. Cl.

| | | |
|---|---|---|
| *B23K 26/70* | (2014.01) | |
| *C21D 9/50* | (2006.01) | |
| *F01D 5/06* | (2006.01) | |
| *C21D 9/00* | (2006.01) | |
| *B23K 101/00* | (2006.01) | |
| *C21D 1/09* | (2006.01) | |
| *C21D 1/30* | (2006.01) | |

(52) U.S. Cl.
CPC ........ *B23K 15/0053* (2013.01); *B23K 26/702* (2015.10); *C21D 9/0068* (2013.01); *C21D 9/50* (2013.01); *F01D 5/063* (2013.01); *B23K 2201/001* (2013.01); *C21D 1/09* (2013.01); *C21D 1/30* (2013.01); *F05D 2220/40* (2013.01); *F05D 2230/234* (2013.01); *F05D 2230/40* (2013.01); *F05D 2240/60* (2013.01)

(56) References Cited

U.S. PATENT DOCUMENTS

| | | | | |
|---|---|---|---|---|
| 4,659,245 A | * | 4/1987 | Hirao | F01D 5/025 403/272 |
| 4,719,074 A | * | 1/1988 | Tsuno | B23P 11/00 123/193.1 |
| 5,158,390 A | * | 10/1992 | Ito | F01D 5/025 29/525 |
| 2001/0027963 A1 | * | 10/2001 | Bazukuri | F01D 5/025 219/121.14 |
| 2004/0057834 A1 | * | 3/2004 | Shimizu | F01D 5/025 416/244 A |
| 2005/0132695 A1 | * | 6/2005 | Carney | B23K 15/0006 60/39.511 |
| 2006/0021221 A1 | * | 2/2006 | Decker | F01D 5/025 29/889.61 |
| 2009/0302012 A1 | * | 12/2009 | Ota | B23K 26/0626 219/121.64 |
| 2010/0108653 A1 | * | 5/2010 | Ota | B23K 26/0066 219/121.85 |
| 2010/0154214 A1 | * | 6/2010 | Hsu | B23K 9/0026 29/889.21 |
| 2010/0326974 A1 | * | 12/2010 | Ota | B23K 31/125 219/121.81 |

FOREIGN PATENT DOCUMENTS

| | | | |
|---|---|---|---|
| JP | 7-74613 B2 | | 8/1995 |
| JP | 7-286528 A | | 10/1995 |
| JP | 07286528 A | * | 10/1995 |
| JP | 2001-254627 A | | 9/2001 |
| JP | 2006-87074 A | | 3/2006 |
| JP | 2009-68380 A | | 4/2009 |
| JP | 2009-203807 A | | 9/2009 |
| JP | 2011-208620 A | | 10/2011 |
| WO | WO 2006/087074 A1 | | 8/2006 |

OTHER PUBLICATIONS

Decision to Grant a Patent effective Feb. 24, 2016 issued in the corresponding Japanese Application No. 2012-041957 with an English Translation.

Office Action dated Sep. 29, 2015 issued in corresponding Japanese Application No. 2012-041957 with an English Translation.

International Preliminary Report on Patentability and Written Opinion of the International Searching Authority (Forms PCT/IB/338, PCT/IB/373, PCT/ISA/237, and PCT/IB/326) for International Application No. PCT/JP2013/054987, dated Sep. 12, 2014, with an English translation.

International Search Report and Written Opinion of the International Searching Authority (Forms PCT/ISA/210, PCT/ISA/237, and PCT/ISA/220) for International Application No. PCT/JP2013/054987, dated May 14, 2013.

Extended European Search Report dated Nov. 5, 2015 issued in the corresponding EP Application No. 13754668.5.

Chinese Office Action, dated May 5, 2017, for Chinese Application No. 201380011085.7, with an English translation.

\* cited by examiner

Related Art

TURBINE ROTOR

TECHNICAL FIELD

The present invention relates to a turbine rotor for e.g. a turbocharger for a car, which enables to reduce residual stress at the time of manufacture and prevent a shaft center leaning of the rotor shaft in operation.

BACKGROUND

A turbine rotor constituting a turbocharger for a car comprises a turbine blade rotor made of a heat-resistant material and a rotor shaft made not necessarily of a heat-resistant material, which are separately manufactured from different materials and then joined together by e.g. electron beam welding, because the turbine blade rotor is required to be heat resistant. That is, as illustrated in FIG. 5, in a conventional turbine rotor 100, a joint face 106 of a turbine blade rotor 102 and a rotor shaft 104 is irradiated with electron beam E while both of the two are rotated, to weld the joint portion 106 over its entire circumference.

In this case, as the two components are circumferentially welded, a residual stress biased along the circumferential direction is generated in the welding portion. Accordingly, a gradient (leaning) 104' of the rotor shaft indicated by the chain double-dashed line may arise, which leads to a shaft center leaning $\Delta\pi$ (see FIG. 5) at the circumference of the turbine blade rotor. Such a leaning may be corrected after welding by machine processing; however, the residual stress will not be removed thereby. Thus, during operation of the turbocharger, when the turbine rotor is heated, the residual stress generated at the time of welding is released, and the leaning of the turbine rotor 100 may occur again. There is a problem such that if leaning occurs, an unbalance force may be applied on the turbine rotor, which may lead to noise or vibration.

Patent Document 1 and 2 each discloses a method to weld a turbine blade rotor and a rotor shaft together by using electron beam. In the welding method disclosed in the Patent Document 1, while a turbine bade rotor made of a heat-resistant metal and a rotor shaft joined to each other are rotated, the joint portion is irradiated with electron beam to weld them together. Then, a prescribed width of the rotor shaft side from the joint portion is swept by and irradiated with electron beam to temper a portion of the rotor shaft near the joint portion, which has been hardened by the influence of the heat of the welding.

On the other hand, in the welding method disclosed in the Patent Document 2, electron beam irradiation devices are provided on plurality of points which are angularly-equally spaced around the joint portion of the turbine blade rotor and the rotor shaft, and welding are carried out at the same time at a number of points which are angularly-equally spaced. It is intended to thereby suppress occurrence of leaning of the rotor shaft due to a contraction stress generated along with solidification of molten metal at the time of welding.

CITATION LIST

Patent Literature

Patent Document 1: JP H7-286528 A
Patent Document 2: JP 2001-254627 A

SUMMARY

Technical Problem

As described above, Patent Document 1, the joint portion is welded by irradiation with electron beam, and then a portion of the rotor shaft near the joint portion, which has been hardened by the influence of the heat of the welding, is swept by and irradiated with electron beam for tempering, whereby a continuous welding treatment becomes possible. That is, it is for the purpose of a solution in a production technology and not for suppressing the leaning of the rotor shaft.

Furthermore, the leaning of the rotor shaft cannot be eliminated only by tempering the region on the rotor shaft side as disclosed in Patent Document 1. Thus, if the leaning of the rotor shaft occurs after the welding, the yield of the turbine rotors may be decreased. Further, if the shaft leaning is to be corrected by machine processing, two steps including a welding step and a machine processing step are required, which may substantially decrease the productivity of the turbine rotor.

On the other hand, it can be considered that the welding method disclosed in Patent Document 2 has an effect of suppressing the residual stress biased along the circumferential direction; however, there is a problem such that it requires a plurality of electron beam devices, which increases the cost.

In view of the above problem of the prior art, the present invention is to provide a turbine rotor capable of suppressing the leaning of the rotor shaft after welding to improve the yield and capable of improving the productivity of the turbine rotor to enable mass production, with a low-cost apparatus.

Solution to Problem

The present invention provides a turbine rotor having a turbine blade rotor made of a material containing heat-resistant metal and a rotor shaft made of a material containing carbon steel which are connected to each other by butt welding, wherein the turbine blade rotor and the rotor shaft are welded together at a joint portion by irradiation with heat generation beam by a heat-generation-beam generating device, and wherein the rotor shaft side of the joint portion containing a butt-welding position is subjected to tempering to obtain the turbine rotor such that a shaft center leaning measured at a circumference of the turbine blade rotor is suppressed to at most 0.2 mm during operation of the turbine rotor;

the tempering being such that a prescribed width of the rotor shaft side of the joint portion containing the butt-welding position is swept by and irradiated with electro-magnetic energy or thermal energy of which dose is adjusted to a prescribed amount by the energy generating device so that a residual stress having a local angular distribution generated in the rotor shaft during the welding is generated over the entire angular range.

It is preferred that the energy generating device used for the tempering is a high-frequency induction heating device or a laser beam generating device. It is preferred that the heat-generation-beam generating device is a laser beam or electron beam generating device.

In the turbine rotor according to the present invention, in contrast to the turbine blade rotor made of a material containing heat-resistant metal, the rotor shaft is made of a material containing carbon steel, which relatively has a good thermal conductivity and a large heat capacity. The thermal expansion amount or the thermal contraction amount of the rotor shaft by the tempering after the welding may thereby become larger relative to the turbine blade rotor. Accordingly residual stress may be generated over the entire circumference in the welding portion. The turbine blade rotor and the rotor shaft are welded together by applying laser beam or electron beam (hereinafter referred to as "heat generation beam") to their joint portion.

Further, the turbine rotor according to the present invention is obtained by having the rotor shaft side of the joint portion containing a butt-welding position subjected to tempering such that a prescribed width of the rotor shaft side of the joint portion containing the butt-welding position is swept by and irradiated with heat generation beam comprising electromagnetic energy or thermal energy (e.g. a high-frequency induction heating device or laser beam) of which dose is adjusted to a prescribed amount by the energy generating device so that a residual stress having a local angular distribution generated in the rotor shaft during the welding is generated over the entire angular range.

Such a turbine rotor obtained by tempering is in a state where the residual stress is balanced along the circumferential direction, and the balanced state will be maintained even after cooling. Accordingly leaning of the rotor shaft will not occur, and leaning will not occur even in a case of heating in operation. That is, it is possible to suppress the shaft center leaning Δσ measured at the circumference of the turbine blade rotor to at most 0.2 mm, in operation of the turbine rotor. By suppressing the shaft center leaning Δσ to at most 0.2 mm, it is possible to suppress actual noise or shaft vibration within an allowable range. Further, by permitting the sweep width of the electromagnetic energy or the thermal energy to correspond to the region which is required to be subjected to tempering, the tempering may be completed with one sweeping, and so the tempering operation may be performed in a short period of time. Thus, that is preferred for mass production of turbine rotors.

The present inventors have conducted various experiments and have found that when the joint face is welded along the circumferential direction, a local stress remains within an angular region of completion of the welding. This is considered because, since the coefficient of thermal expansion of the rotor shaft is larger than that of the turbine blade rotor, a tensile force is applied to the welding portion by the thermal expansion of the portion near the welding portion of the rotor shaft at the time of welding, and the angular region of completion of the welding is exposed to welding heat for the longest period of time, and therefore the largest tensile force is applied thereon.

Accordingly, the tempering for the turbine rotor may be such that more tempering treatment is performed within a region other than the angular region of completion of the welding (a region of about 0° to 90°). For example, it may be such that in a case where welding is performed for one revolution (360°) or two revolution (720°) for the joint face, and then the output is gradually decreased during about half revolution (180°) and tempering of the rotor shaft side of the joint portion containing the welding position is performed for one revolution or two revolutions, the tempering may be omitted within the angular region of completion of the welding of from 270° to 360°. In the region other than the region of completion of the welding, the rotor shaft may be expanded to generate a residual stress in the welding portion, which has been cooled, whereby the residual stress may evenly be generated over the entire circumference of the rotor shaft.

For the tempering, a high-frequency heating device or a laser beam generating device may be used. Since the high-frequency heating device may be compact and lightweight and is capable of high-efficiency power generation, it enables power saving and cost reduction. Further, since the high-frequency heating device is capable of rapid high-temperature heating, it is suitable for mass production. By the laser beam generating device, a high power density may be obtained with a small heat input and with a small heat effect on the surrounding part, and the position of beam irradiation may be precisely controlled. Further, when employing the laser beam generating device, the environment surrounding the welding portion is not required to be maintained as a vacuum. Thus it enables cost reduction, and it is suitable for mass production.

Advantageous Effects

According to the present invention, since the welding of the turbine blade rotor and the rotor shaft is performed, a region on the rotor shaft side near the joint portion containing the welding position is subjected to tempering so that a residual stress having a local angular distribution generated in the rotor shaft during the welding is generated over the entire angular range, the turbine rotor is capable of suppressing leaning of the rotor shaft after cooling or in operation thereafter. Accordingly, a turbine rotor by which leaning of the rotor shaft is suppressed may be manufactured at low cost. Further, since correction by machine processing after the welding becomes unnecessary, the yield may be improved and the production time may be shortened, and thus it is suitable for mass production.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1A:
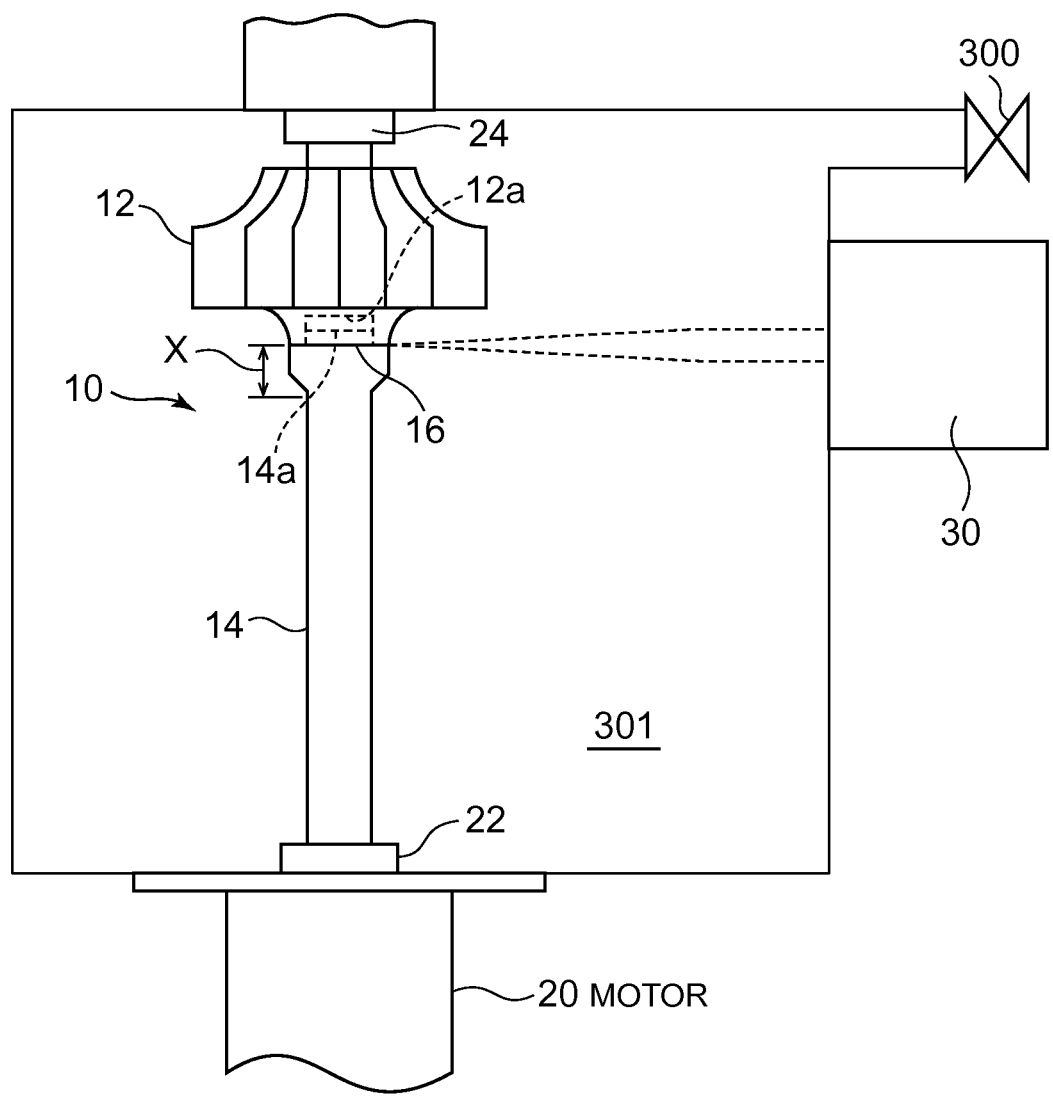
FIG. 1A is a front view of a welding apparatus employing electron beam according to the present invention.

An embodiment of the present invention will now be described with reference to FIG. 1A to FIG. 4. FIG. 1A is a view illustrating a welding apparatus for welding a turbine blade rotor 12 and a rotor shaft 14 constituting a turbine rotor 10. A motor 20 has an output shaft, which is connected to a chuck 22, and the lower end of the rotor shaft 14 is fixed to the chuck 22. The rotor shaft 14 is rotatable together with the chuck 22 by the motor 20. The rotor shaft 14 has a convex portion 14a having a diameter smaller than the rotor shaft 14, formed at the upper end of the rotor shaft 14. On the other hand, the turbine blade rotor 12 has a concave portion 12a to be fitted to the convex portion 14a, formed at the center of the lower face of the turbine blade rotor 12.

These concave and convex portions 12a and 14a are fitted to each other, and the turbine blade rotor 12 and the rotor shaft 14 are thereby positioned, and they are rotatable together. The turbine blade rotor 12 is made of a heat-resistant material such as inconel, and the rotor shaft 14 is made of carbon steel. Accordingly, the rotor shaft 14 has a larger thermal conductivity and a larger heat capacity than the turbine blade rotor 12.

The turbine blade rotor 12 is rotatably supported by the chuck 24 at the center of the upper end, and the turbine blade rotor 12 is synchronously rotatable with the rotor shaft 14 by means of the chuck 22. The concave and convex portions 12a and 14a are in contact with each other to form a joint face 16. An electron beam generating device 30 disposed near the positioned turbine blade rotor 10 emits electron beam L toward the joint face 16. A vacuum valve 300 is provided to maintain the environment within the vacuum chamber 301 as a vacuum.

In the above structure, while the concave portion 12a of the turbine blade rotor 12 and the convex portion 14a of the rotor shaft 14 are fitted to each other, the motor 20 is rotated to rotate the turbine blade rotor 12 and the rotor shaft 14. The electron beam L is collected to the center side by a collecting lens 34 and then applied toward the joint face 16. The peripheral portion of the joint face 16 is thereby heated and melted, whereby the joint face 16 is welded.

Figure 2A:
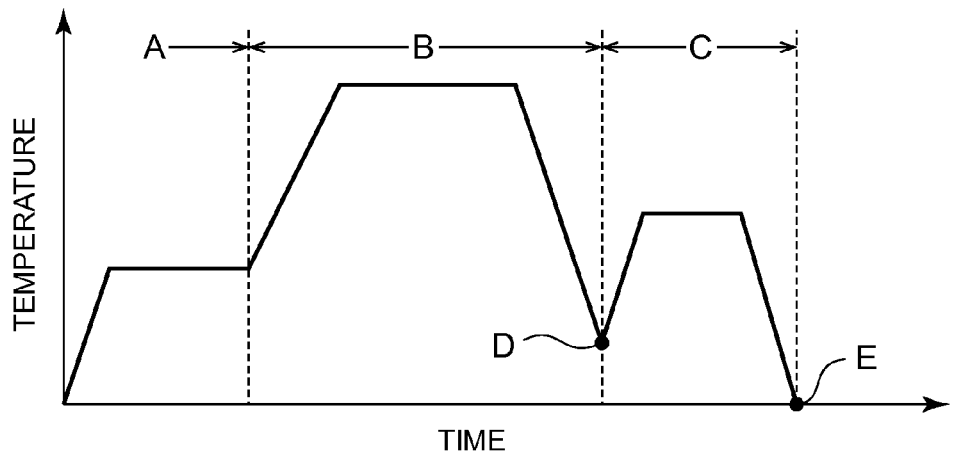
FIG. 2A is a chart for explaining a thermal treatment step according to the embodiment, FIG. 2B

FIG. 2A is a chart for explaining a thermal treatment step according to the embodiment employing the electron beam generating device 30. Firstly, the temperature is raised from room temperature to 450° C.-550° C. to perform a preheating step A over the entire circumference.

Next, from the electron beam generating device 30, electron beam L is applied to the joint face 16 to perform a welding step B where the temperature is raised to 1,500° C.-1,700° C. for one revolution (360°) over the entire circumference, and then the output is gradually decreased during about half revolution (180°) to complete the welding.

Figure 1B:
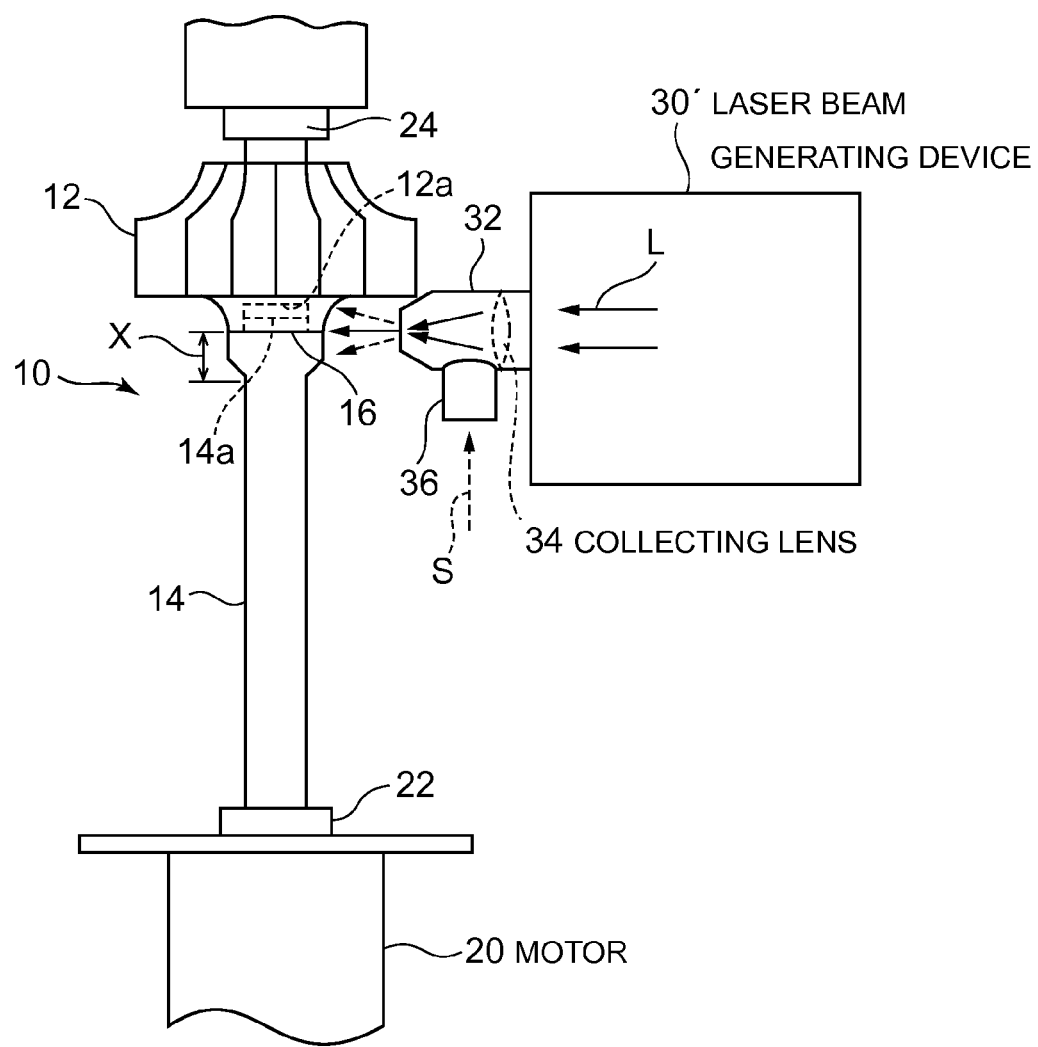
FIG. 1B is a front view of a tempering apparatus employing laser beam according to the present invention.

FIG. 1B is a view of a tempering apparatus to temper the welded joint face. The laser generating device 30' has a collecting lens 34 provided within a duct 32, and laser beam L is collected by the collecting lens 34 and then is applied to the joint face 16. The duct 32 has a branched duct 36, to which a shield gas S such as argon or helium, is supplied. The shield gas S is supplied to around the laser beam L applied toward the joint face 16 as a shield gas to prevent oxidation of a molten metal.

By means of this apparatus, a tempering step C is performed. In the tempering step C, as illustrated in FIG. 1B, the region X on the rotor shaft side, including the welding portion, near the welding portion is heated at a temperature of 400° C.-750° C. with a high-frequency heat source or laser beam L and then is cooled. In a case of employing laser beam in this tempering step C, sweeping with laser beam L is performed to temper the region X for one revolution (360°) or two revolutions (720°). In this case, it is preferred that the laser beam L is not applied to a range of 0° to 90° of an angular region of completion of the welding. The laser beam L can be polarized by permitting the laser beam L to be reflected by a reflecting mirror (not shown) provided within the laser beam generating device 30'.

Figure 3:
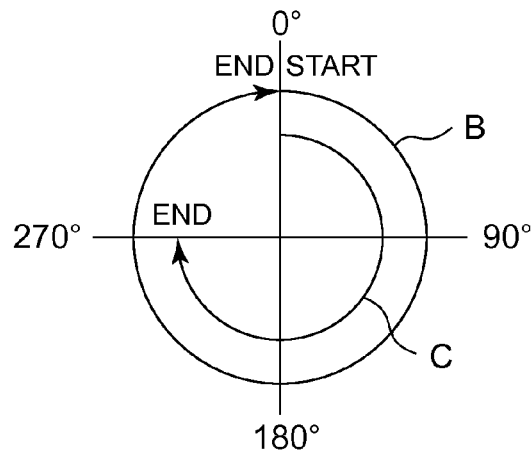
FIG. 3 is an explanatory chart showing a welding method and a tempering method according to the embodiment.

FIG. 3 is a chart showing a case where welding for the joint face 16 is performed for one revolution, and then tempering for the region X at the rotor shaft side including the welding portion is performed for a degree of [one revolution 360°)-90°]. In this case, in the welding step B, irradiation is started from the starting point of 0°, and the peripheral portion of the joint face 16 is irradiated until the irradiation position completes one revolution around the joint face 16 and comes back to the position of 0°. Then, in the tempering step C, the laser beam L is polarized to the region X on the rotor shaft side containing the welding portion. The irradiation with the laser beam L is started from the position of 0° C. and is continued to the position of 270°.

Figure 4:
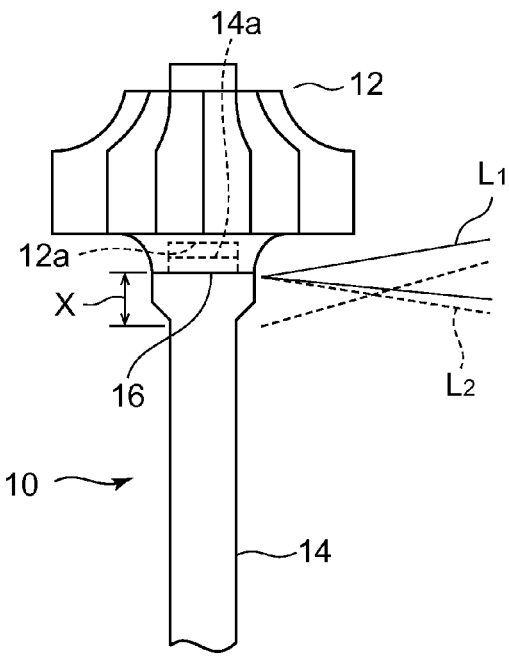
FIG. 4 is an explanatory diagram illustrating laser beam applied in the embodiment.
Figure 5:
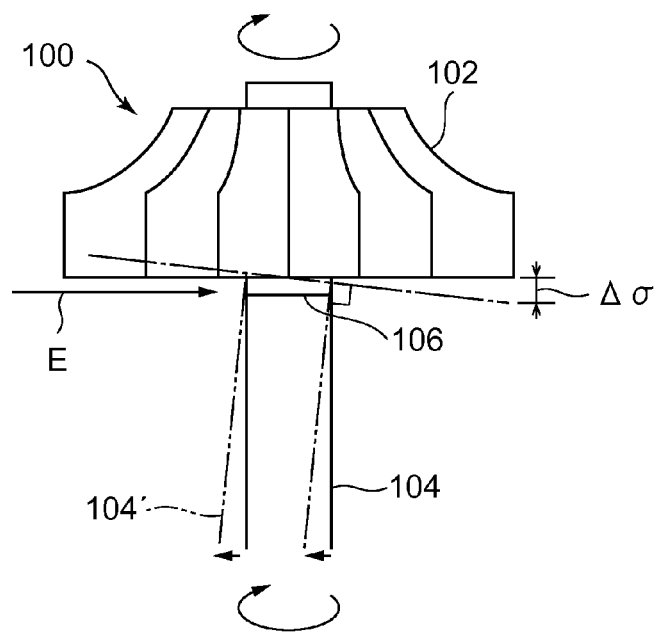
FIG. 5 is an explanatory diagram illustrating leaning of a rotor shaft of a conventional turbine rotor.

In FIG. 4, difference in the light collection degree of the laser beam L depending on the irradiation objects. Laser beam $L_1$ indicates a light collection degree in the welding step B. In the welding step B, the light collection degree is increased by collecting the laser beam at a point on the joint face 16 by the collecting lens 34. A high power density can thereby be obtained, which results in instant melting, whereby a rapid welding may become possible, and the welding time may be shortened. (Accordingly, laser beam may be used for welding in place of electron beam.)

In the present invention, laser beam $L_2$ is used in the tempering step C. In this case, as illustrated in FIG. 1B and FIG. 4, the collecting range of the laser beam $L_2$ is distributed corresponding to the range of the region X on the rotor shaft side containing the welding portion. It is thereby possible to reduce the power density to a degree at which the heating temperature required in the tempering step C may be obtained. Further, by expanding the collecting range, the entire region of the region X on the rotor shaft side containing the welding portion with irradiation for one revolution. The laser beam $L_1$ or the laser beam $L_2$, or electron beam or laser beam is applied toward the joint face 16 or the region X on the rotor shaft side containing the welding portion in such a way.

Figure 2B:
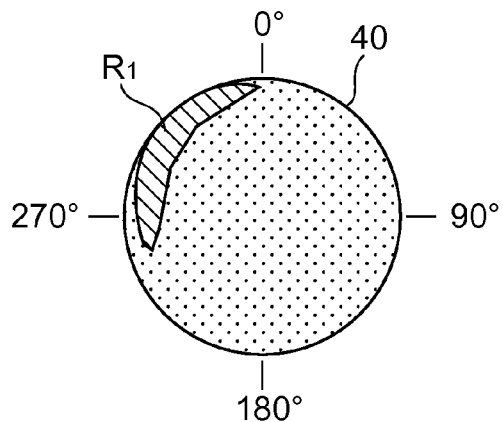
FIG. 2C is each a cross-sectional view of a welding portion in the thermal treatment step.

In FIG. 2B, a states of a residual stress generated in the welding portion 40 at the point D in the FIG. 2A, after carrying out the welding step B. As shown in FIG. 3, when irradiation of the laser beam L is performed for one revolution from 0° as the starting point, a residual stress $R_1$ is generated in the angular region of completion of the welding at 270° or later. This is considered because, since the angular region of completion of the welding is exposed to welding heat for the longest period of time, the largest tensile force is applied due to the thermal expansion of a portion of the rotor shaft near the welding portion, and this tensile force becomes a local residual stress in the angular region of completion of the welding.

Figure 2C:
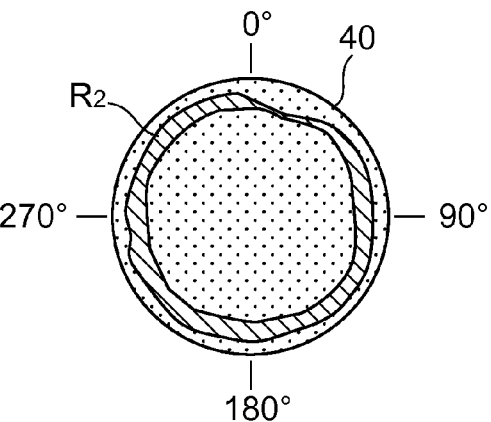

Accordingly, in this embodiment, in the tempering step C, the laser beam $L_2$ is applied to a region from the starting point of 0° to 270° without laser beam application to the region of completion. The rotor shaft 14 is thereby expanded in the region other than the angular region of completion, and a residual stress is generated in the welding portion 40. Therefore it is possible to generate a residual stress $R_2$ evenly over the entire circumference of the welding portion 40, as seen in FIG. 2C.

Accordingly, as the residual stress $R_2$ is balanced along the circumferential direction of the welding portion 40, such a balanced state of the residual stress may be maintained even after cooling. Thus, leaning of the rotor shaft 14 will not occur, and leaning will not occur even in a case of heating in operation. According to this embodiment, when the turbine rotor 10 is employed in a turbocharger for a car, the shaft center leaning Δσ measured at a circumference of the turbine blade rotor can be suppressed to at most 0.2 mm in operation of the turbocharger for a car. By suppressing the shaft center leaning Δσ to at most 0.2 mm, it is possible to suppress actual noise or shaft vibration within an allowable range.

Further, by using at least the laser beam generating device 30', a high power density may be obtained, whereby rapid welding may become possible, which is suitable for mass production. Further, the heat input is small and the heat effect on the surrounding part is small, and the position of beam irradiation may be precisely controlled. Further, since the environment surrounding the welding portion is not required to be maintained as a vacuum as in the case of electron beam, the cost may be reduced. Further, in the tempering step C, as the collecting range of the laser beam L is permitted to correspond to the region X on the rotor shaft side containing the welding portion, the tempering step C can be completed only with one revolution or two revolutions of the turbine rotor 10, whereby the tempering step C may be shortened.

This embodiment is an example where a laser beam generating device is used as the heating device for tempering, but a high-frequency heating device may also be used in place of the laser beam generating device. A high-frequency heating device enables downsizing and weight saving of a device and capable of high-efficiency power generation, which enables power saving and cost reduction. Further, as it is capable of rapid high-temperature heating, it is suitable for mass production, and the heating temperature may be precisely controlled without contact by a high-frequency electromagnetic field.

INDUSTRIAL APPLICABILITY

According to the present invention, the shaft center leaning of the rotor shaft after welding can be suppressed, whereby it is possible to improve the yield and to produce a turbine rotor enabling mass production, at low cost.

The invention claimed is:

1. A method for manufacturing a turbine rotor having a turbine blade made of a material containing heat-resistant metal and a rotor shaft made of a material containing carbon steel which are connected to each other by butt welding, comprising the steps of:
    welding a joint portion of the turbine blade and the rotor shaft at the joint portion by irradiation with a first beam for one revolution or two revolutions from a starting point of welding in a prescribed rotating direction; and
    after the welding, tempering a prescribed range of a rotor shaft side of the joint portion by irradiation with a second beam from the starting point of welding in the prescribed rotating direction, wherein
    when said welding is carried out for one revolution, said prescribed range of tempering is from the starting point to a point approximately 270° from the starting point;
    when said welding is carried out in two revolutions, said prescribed range of tempering is one revolution plus approximately 270° in a second revolution.

2. The manufacturing method for a turbine rotor according to claim 1,
    wherein the welding step includes welding by irradiation at the joint portion with the first beam for one revolution or two revolutions from the starting point of welding in the prescribed rotating direction, followed by welding by irradiation with the first beam while decreasing gradually an output of the first beam during approximately a half revolution.

3. The manufacturing method for a turbine rotor according to claim 1, comprising
    generating both the first beam used in the welding and the second beam used in the tempering from a laser beam generating device,
    in the welding step, collecting the laser beam generated from the laser beam generating device and applying the beam to the joint portion, and
    in the tempering step, distributing the laser beam generated from the laser beam generating device so as to apply to the joint portion over the prescribed range.

* * * * *